United States Patent [19]
Pokhodnya et al.

[11] 3,808,398
[45] Apr. 30, 1974

[54] WELDING WIRE

[76] Inventors: Igor Konstantinovich Pokhodnya, pereulok Mechnikova, 3, kv. 21; Vladimir Nikolaevich Golovko, ulitsa Vladimirskaya, 9, kv. 29, both of Kiev, U.S.S.R.

[22] Filed: Apr. 19, 1973

[21] Appl. No.: 352,630

[52] U.S. Cl. .............................. 219/146, 219/137
[51] Int. Cl. .......................................... B23k 35/22
[58] Field of Search ............ 219/145, 146, 137, 73; 148/24, 25, 26; 117/202–207

[56] References Cited
UNITED STATES PATENTS

| | | | |
|---|---|---|---|
| 3,733,458 | 5/1973 | Pokhodnya et al. | 219/146 |
| 3,539,765 | 11/1970 | Buttera | 219/146 |
| 3,221,136 | 11/1965 | Freeth et al. | 117/205 X |

*Primary Examiner*—J. V. Truhe
*Assistant Examiner*—Gale R. Peterson
*Attorney, Agent, or Firm*—Eric H. Waters

[57] ABSTRACT

A steel case encloses a flux core containing the following components in per cent by weight of the core:

| | |
|---|---|
| rutile | 40–75 |
| ferromanganese | 17–28 |
| ferrosilicium | 1.8–9.5 |
| hematite | 3.0–9.5 |
| feldspar | 1.8–7.5 |
| sodium fluosilicate | 1.2–6.0 |

1 Claim, No Drawings

WELDING WIRE

The present invention relates to welding material for electrode-arc welding and more particularly to welding wires for welding and building up steels in a protective gas medium.

The invention is most effective when employed for automatic and semi-automatic welding, the welds being downhand, inclined or horizontal on a vertical plane.

Known in the art are welding wires for welding and building up steels in a protective gas medium, made as a steel case enclosing a flux core. Noted for best welding properties are those welding wires whose core contains rutile. Specifically, known in the art is a welding wire of the above type (so-called flux-cored electrode), containing by weight per cent: rutile 55, manganese 16, ferrosilicium 14, plus additives. The latter are represented in said wire by magnetite in terms of 15 percent by weight of the core. The steel case of this wire accounts for 84 percent of the total weight of the electrode.

However, this above wire does not ensure high mechanical properties for the weld metal. Thus $A_H$ (impact work) is but 8 to 9 kgm at +20°C and as low as 3 to 4 kgm at −18°C.

The welding of a corroded metal results in the formation of pores in the metal joint.

It is commonly known that the presence of hydrogen in the weld metal produces quite an unfavourable effect on the mechanical properties thereof.

The abovestated composition of welding wires does not include elements binding hydrogen into compounds insoluble in the weld metal. Therefore the sphere of applications of such welding wires is limited. Thus, they cannot be applied in constructions epxosed to dynamic loads and in those intended for operation at low temperatures.

Also known is a welding wire which ensures high mechanical properties of the weld metal and whose flux core enclosed by a steel case contains (in per cent by weight of the core):

rutile 20–40
ferromanganese 10–13
ferrosilicium 0.6–2.0
feldspar 0.6–6.0
sodium fluosilicate 0.6–4.5
iron powder 37.0–68.0
(cf. see DDR patent N 90691).

However, the presence of iron powder in the wire core reduces the storage life of the wire.

The properties of a wire shows flux core was wetted, which caused corrosion of the iron powder, cannot be restored through calcination.

Besides, the presence of iron powder containing large quantities of hydrogen and oxygen in the core of the wire substantially increases the tendency of the weld metal to pore formation, especially when welding a corroded metal.

An important object of the invention is to provide such welding wire for welding and building up steels in a protective gas medium and the composition of whose core would ensure good wleding and mechanical properties for the weld metal over a wide range of process modes.

Another important object of the invention is to provide a welding wire of the above type as would ensure high deposition rate with no pores in the weld metal, especially when welding metal is coated with scale and rust.

These and other objects of the invention are achieved by providing a welding wire for welding and building up steels in a protective gas medium, in the form of a steel case enclosing a flux core containing rutile, ferromanganese, ferrosilicium and additives, wherein, according to the invention the flux core, in addition to the above components taken in the following per cent by weight of the core rutile 40–75
ferromanganese 17–28
ferrosilicium 1.8–9.5, contains as additives
hematite 3.0–9.5
feldspar 1.8–7.5
sodium fluosilicate 1.2–6.0

The presence of rutile in the above quantities in the flux core of the proposed wire ensures stable arcing and excellent formation of the weld metal.

It has been established that the reduction of the rutile content in the proposed wire below the prescribed lower limit is impermissible as this sharply affects the arcing stability and leads to strong splashing of welded metal. The exceeding of the upper limit results in the lagging of the core melting rate behind the melting rate of the steel sheath, which contributes to a greater content of non-metal impurities in the weld metal in the form of unmelted core particles and thus markedly deteriorates the properties of the built-up metal.

The contents of ferromanganese and ferrosilicium are established with the view of ensuring high mechanical properties for the weld metal. The prescribed contents of the above elements in the proposed wire being maintained intact, easily melted ferromanganese silicates are formed in the weld metal, that coagulate and float up readily. The non-metal impurities that remain in the metal have a round shape. All this adversely affects the impact strength of the weld metal.

Reduction of the ferromanganese and ferrosilicium content below the specified limits is not permissible due to the emergence of pores in the weld metal. The contents of these said elements higher than the upper limits lead to a much greater strength and reduced plasticity of the weld metal.

To obtain a slag with good physical properties, it is required to provide for hematite inclusion into the core of the proposed wire.

It has been established that the reduction of the hematite content below the prescribed lower limit causes sharp deterioration of the weld metal being formed. This is conditioned by a very narrow range of crystallization of slags containing only rutile. Quick to crystallize on the weld surface, such slag precludes the exit of gases from the metal. The surface of such weld is full of hollows which emerge due to the pressure of gases present on the interface of flux and metal. To expand the range of slag crystallization, the wire core should contain hematite.

The content of hematite above 9.5 percent increases considerably the tendency of the weld metal to hot cracks, as it is conductive to the formation of easily melted intercrystallite layers.

The presence of feldspar in the core in the specified quantity increases the arching stability and improves the operation characteristics of the slag.

The content of feldspar below the lower limits, the welds have cuts, which is impermissible a defect. An increase above the upper limit results in the deterioration of the physical properties of the slag because of a considerable increase in its viscosity and deterioration of its refining capacity, which is known universally.

In the course of welding, especially of a metal coated with scale and rust, there is much hydrogen within the arcing zone. It is well-known that hydrogen dissolving in metal at high temperatures separates out of metal during crystallization. As its separation rate is not high, pores emerge in the weld metal and the content of the remaining hydrogen is great, which is very unfavourable for the mechanical properties of metal. To preclude the dissolving of hydrogen in the weld metal, sodium fluosilicate is introduced into the proposed wire in the prescribed quantities. The content of sodium fluosilicate below the specified lower limit does not bring about the desired effect. The exceeding of the upper limit results in a sharp deterioration of the arcing stability and, consequently, in strong splashing of welding metal.

The wire with the core composition according to the invention features excellent welding characteristics, ensures a limited content of gases in the weld metal and high quality of welds at the same time. Welds made by the proposed wire possess high resistance to pores. The properties of the wire whose core was wetted can be restored through calcination at 250°–300°C.

The selected relation of the components permits to obtain a slag with good physical properties. The presence in the core of sodium fluosilicate and the absence of iron powder permitted to sharply reduce the content of gases in the metal of welds and raise their resistance to pores and cracks.

The advantages of the proposed welding wire over the known wires can be seen from the following examples.

During welding, use has been made of welding wires (designated as A, B and C), 2.0 mm in diameter, with a flux core according to the invention. The steel case in each wire accounted for 84 percent of the total weight of said wire.

The welding was made downhand and effected by a semiautomatic method on a reverse polarity current.

Welding conditions:
welding current    350–450A;
arc voltage    28–35 V.
Used as a protective medium was $CO_2$.

A 16 mm thick steel being welded had the following composition: 0.18 percent carbon, 0.45 percent manganese; 0.20 percent cremnium; 0.020 percent sulfur; 0.015 percent phosphorus, iron being the rest.

The composition of said welding wires is given in the following Table 1.

TABLE 1

| Core ingredients | Welding wire A | B | C |
|---|---|---|---|
| | content of core ingredients in % by weight of the core | | |
| rutile | 75.0 | 55.7 | 40.0 |
| ferromanganese | 17.0 | 25.0 | 28.0 |
| ferrosilicium | 1.9 | 5.0 | 9.4 |
| hematite | 3.1 | 7.5 | 9.4 |
| feldspar | 1.8 | 3.7 | 7.5 |
| sodium fluosilicate | 1.2 | 3.1 | 5.7 |

The results of testing the metal of welds made by said welding wires.

TABLE 2

| Welding wire | Tensile strength kg/mm$^2$ | Relative deformation, % | Impact strength, break test, kgm/cm$^2$ | |
|---|---|---|---|---|
| | | | +20°C | −60°C |
| A | 48–52 | 24–28 | 13–15 | 5–6 |
| B | 50–55 | 28–32 | 15–20 | 10–12 |
| C | 58–62 | 25–28 | 15–17 | 6–8 |

The welding by means of wires with cores whose compositions are specified in the examples is done semiautomatically or automatically, the welds being downhand, inclined or horizontal on the vertical plane.

The cited examples are sufficient to disclose the advantages of the proposed wire.

From Table 2 it is clear that the metal of welds made by welding wires A, B and C features high mechanical properties.

Further, the welding wires prepared according to the invention ensure excellent weld formation, easy separation of slag crust and a deposition rate reaching 10–14 kg/h. The splashing of weld metal is minimum. Welds made by the proposed wire stand out for their high mechanical properties and high resistance to pores and cracks. The wire permits to weld corroded metal, too. The properties of a wire whose core was wetted can be restored through calcination at 250°–300°C.

What is claimed is:

1. A welding wire for welding and building up steels in a protective gas medium, made as a steel case enclosing a flux core containing the following components in per cent by weight of the core:

rutile    40–75
ferromanganese    17–28
ferrosilicium contains as    1.8–9.5
additives hematite    3.0–9.5
feldspar    1.8–7.5
sodium fluosilicate    1.2–6.0

* * * * *